United States Patent [19]

Kob et al.

[11] 4,111,457
[45] Sep. 5, 1978

[54] INFLATABLE RESTRAINING DEVICE FOR MOTOR VEHICLES

[75] Inventors: Adolf Kob, Erding; Eduard Blatner, Augsburg, both of Fed. Rep. of Germany

[73] Assignee: Bayerische Motoren Werke AG, Fed. Rep. of Germany

[21] Appl. No.: 748,156

[22] Filed: Dec. 7, 1976

[30] Foreign Application Priority Data

Dec. 19, 1975 [DE] Fed. Rep. of Germany ... 7540488[U]

[51] Int. Cl.² ............................................. B60R 21/08
[52] U.S. Cl. .................................. 280/728; 280/743; 285/253; 285/331
[58] Field of Search ............................... 280/728–743; 150/1, 8; 220/319, 320; 244/31; 9/316; 152/362 R; 49/490; 285/253, 331

[56] References Cited

U.S. PATENT DOCUMENTS

| | | | |
|---|---|---|---|
| 1,116,049 | 11/1914 | Feeny | 285/253 |
| 1,459,377 | 6/1923 | Peeples | 152/362 R |
| 2,601,995 | 7/1952 | Skopic | 285/331 |
| 2,691,352 | 10/1954 | Bowden | 49/490 X |
| 2,755,125 | 7/1956 | Hodges | 280/732 X |
| 2,850,291 | 9/1958 | Ziccardi | 280/735 |
| 2,919,083 | 12/1959 | Suomi et al. | 244/31 |
| 3,133,575 | 5/1964 | Slemmons | 150/8 X |
| 3,368,599 | 2/1968 | Dailey et al. | 150/8 |
| 3,618,980 | 11/1971 | Leising | 280/736 |
| 3,708,181 | 1/1973 | Mazelsky | 280/740 |

*Primary Examiner*—Kenneth H. Betts
*Attorney, Agent, or Firm*—Craig & Antonelli

[57] ABSTRACT

An elastic intermediate inset means for a restraining device used in passenger motor vehicles comprising an inflatable bag, an inflating means, a flange and/or housing for holding the bag, and clamping means for connecting the rim and the flange. The elastic insert means connects the rim of the bag with the flange as well as the clamping means so as to avoid damage to the inflatable bag and, at the same time, to damp vibrations.

11 Claims, 3 Drawing Figures

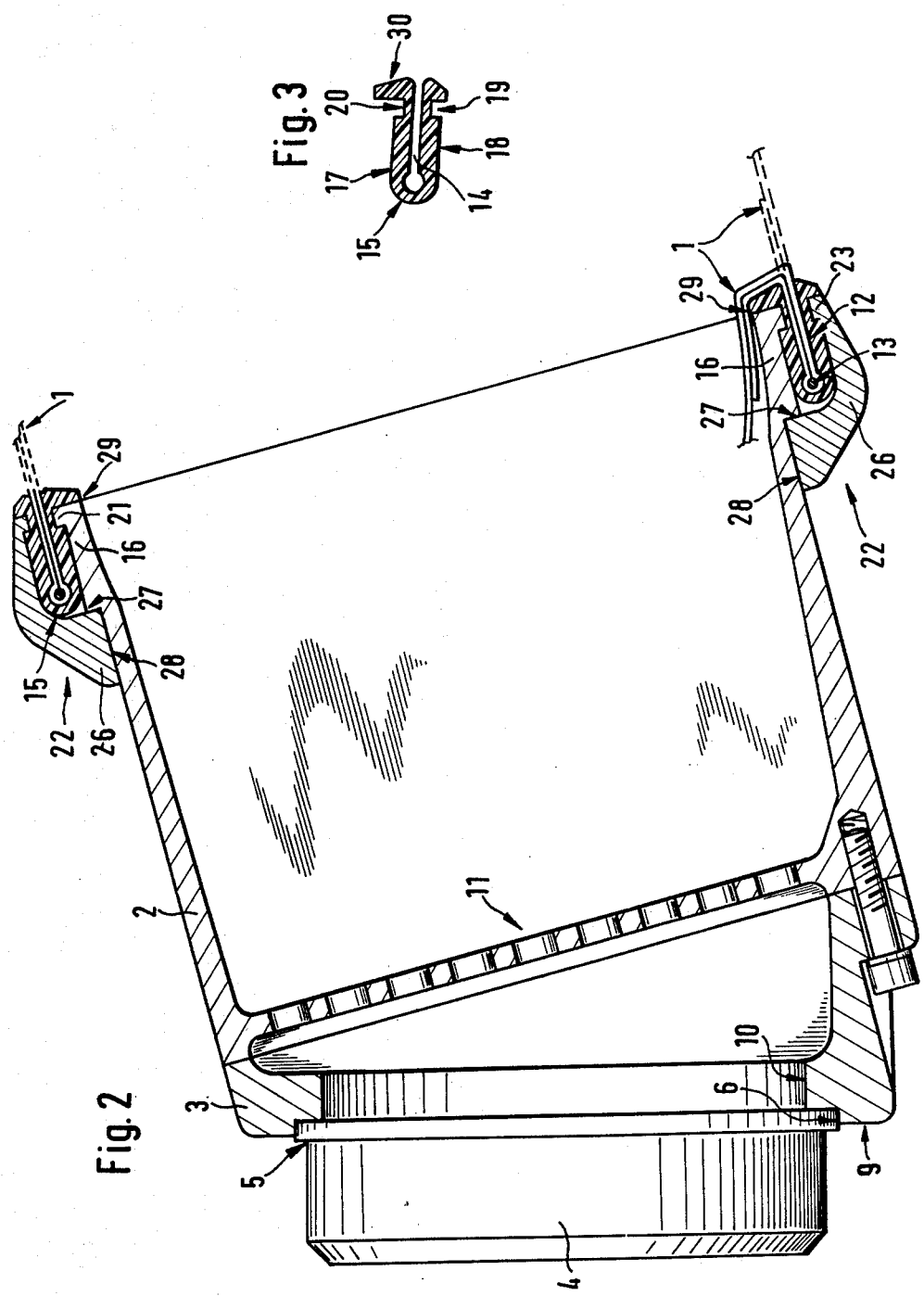

INFLATABLE RESTRAINING DEVICE FOR MOTOR VEHICLES

BACKGROUND OF THE INVENTION

The present invention relates to a restraining device for the occupants of a vehicle, especially a passenger car, consisting essentially of an inflatable bag, an inflating device, and a flange for holding the bag. The bag is connected with the flange by way of the rim of its opening, and is held by a clamping means acting on the rim.

A clamping means intended for the aforementioned purpose is disclosed in U.S. Pat. No. 2,755,125 in the form of a hose fastener clamping band and in U.S. Pat. No. 2,850,291 in the form of a ring of solid material. With the use of such clamping means acting directly on the bag, the rim of the bag can be excessively clamped during assembly. At the locations of a strong clamping action, the material constituting the bag is subject to being overstrained whereby especially at the transition from the clamped section to the inflatable, unclamped part of the bag, the material becomes brittle and/or cracks occur. A material which is brittle in the clamping zone or at the location where it is mounted under tension will tear, certainly at the latest when the bag is placed into operation. Such a bag, when placed into operation, will lose propellant gas because of the cracks occurring in the zone of the clamping mounting. However, this disadvantageously reduces the restraining action of such a bag and/or makes such action doubtful.

SUMMARY OF THE INVENTION

The present invention is based on the recognition and solution to the need of connecting an inflatable bag with a holding flange by way of a clamping means of the above-described type so as to be certain that any damage to the bag is avoided even in case of an improper handling of the clamping means.

In accordance with the present invention, this problem has been solved by connecting the rim of the bag with the flange as well as with the clamping means by means of an elastic inset. The concept of this invention is realized in a preferred embodiment in the form of a profiled strip of a rubber-elastic material encompassing the rim of the bag.

The present invention affords advantages in several respects. On the one hand, in case of clamping means of the aforementioned type which are manufactured from a metal, the sections of the clamping means which are excited to vibrations due to vehicle vibrations are not directly effective on the bag. In case of clamping means, linearly extending sections tend preferably toward vibrations, as they exist between the corners of a holding flange on a housing of the inflating device which has, for example, a rectangular shape. On the other hand, the rubber-elastic material has a vibration-damping effect.

BRIEF DESCRIPTION OF THE DRAWING

These and further features, advantages and objects of the present invention will become more apparent from the following description when taken in conjunction with the accompanying drawing which shows, for purposes of illustration, an embodiment of the present invention and wherein:

FIG. 2 is a sectional view along line II—II of FIG. 1; and

FIG. 3 shows the profiled strip of the present invention in a sectional view.

DETAILED DESCRIPTION OF A PREFERRED EMBODIMENT

Figure 1:
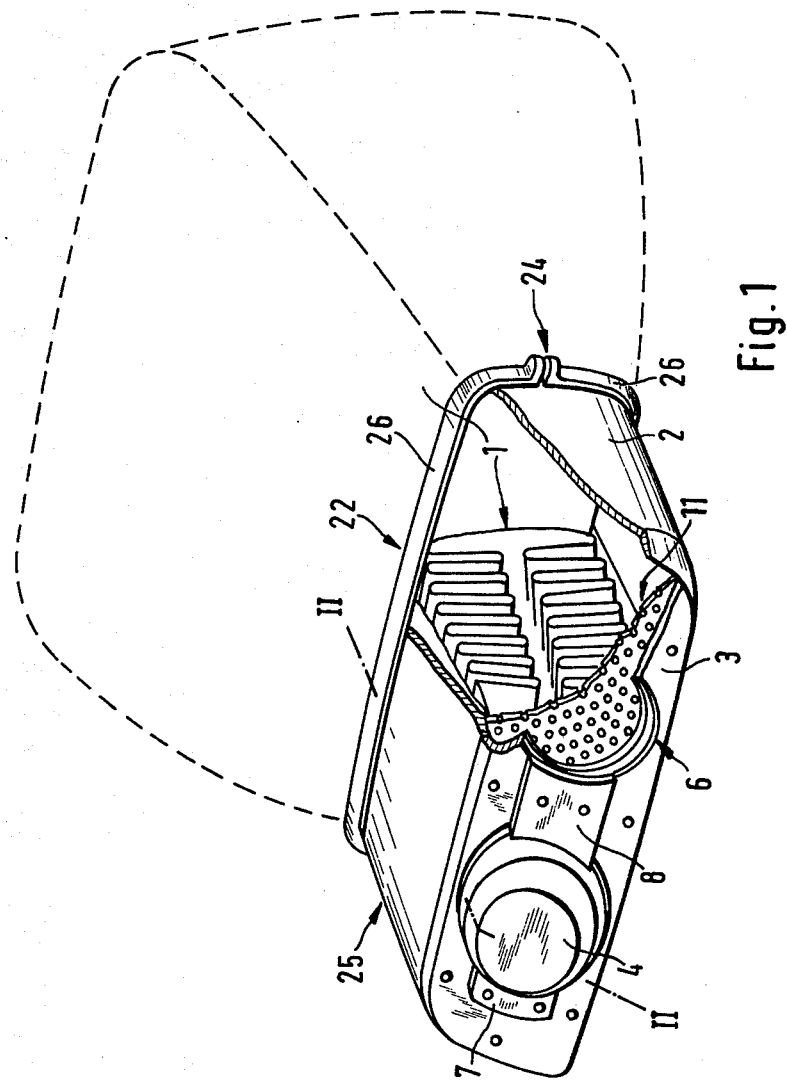
FIG. 1 shows a restraining device in a partially sectioned, perspective view.

Referring now to the drawing and, in particular, to FIG. 1, the restraining device consists of an inflatable bag 1 (the dashed lines showing the bag 1 in the active or inflated position) and an inflating unit comprising the components consisting of housing 2, a support 3, and a gas generator 4. The bag 1 and the support 3 are mounted on the housing 2. Solid gas generators 4 are attached to the support 3, although only one of these generators is illustrated. Each gas generator 4 is of a rotationally symmetrical configuration and is provided with a flange 5, by way of which the gas generator 4 is centered in a recess 6 in the support 3. Each gas generator 4 is held by way of mounting plates 7, 8 which are threadedly attached to the support 3 in a conventional manner and which act on the flange 5 projecting beyond the end face 9 of the support 3.

In the support 3, which is attached to the housing 2 by screws or the like, the recess 6 is followed by a passage 10 for conducting the gases produced by each gas generator 4 into the housing 2. In direct proximity to the zone connecting the housing 2 with the support 3, a screen in the form of a perforated plate 11 is arranged in the housing 2 and extends over the entire internal cross-section of the housing 2. The perforated plate 11 is integrally connected to the outer walls of the housing 2 which is formed as a casting, preferably of a light metal casting. The support 3 is likewise fabricated as a light metal casting, thereby yielding a rigid and relatively lightweight design of the housing 2 and the support 3.

As can be seen from FIG. 1, the uninflated bag 1 is deposited in the housing 2 in a folded condition. The housing 2 is of rectangular configuration at its mouth where it terminates and provides a transition at the bag 1. A recess adapted to this rectangular shape is provided in the bag 1, which cooperates by way of the rim 12 delimiting the recess for attachment to the housing 2.

As can be seen in FIG. 2, the rim 12 of the bag 1 is bent about a cord-like insert 13 so as to be made of a double layer and bead-shaped at its free end. The rim 12 is introduced into a channel 14 of a profiled strip 15, which channel has an approximately keyhole-shaped cross section. The profiled strip 15 is made of a rubber-elastic material, and each profiled strip 15 for a bag 1 is formed as a section of an endless extruded profile in order to employ advantageously the most economical method of production. By means of the profiled strip 15 arranged on the rim 12, the bag 1 encompasses the housing 2, and a flange 16 integrally joined to the housing 2 serves to support the profiled strip 15. The outer surfaces 17, 18 of the profiled strip 15 each have one channel-like indentation 19, 20, respectively. A projection 21 on the flange 16 extends into the indentation 20 which is shown most clearly in FIG. 3. This projection acts as an abutment on the housing side for the profiled strip 15.

A clamping means for the strip provided with an angled section 23 engages into the indentation 19 and likewise serves as an abutment for the profiled strip 15. The clamping means 22 can be constructed as a ring 26 consisting of two halves which can be mutually tensioned at 24 and 25 by well-known tensioning means. The ring 26 can also be made of a light metal casting. As shown in FIG. 2, the clamping ring 26 has a substantially U-shaped cross section with the longer leg cooperating with an abutment 27 at the housing 2 and the short leg constituting the angled section 23.

The tensile stress occurring at the rim 12 when the bag 1 is inflated is transmitted via the profiled strip 15 to the abutments 21 and 23, with the clamping ring 26 supporting the proportional tensile stress via its long leg on the abutment 27 on the housing side. To avoid a disadvantageous, excessive squeezing of the profiled strip 15 enclosed between the flange 16 and the clamping ring 26, the clamping ring 26, after reaching a predetermined clamping action, abuts with the end face 28 located at the long leg against the horizontally extending outer walls of the housing 2. Furthermore, in order to avoid having the bag 1 in its folded condition rub against the housing edge 29, this bag being joined along its rim 12 via a profiled strip 15 of a rubber-elastic material indirectly to the clamping ring 26 and the flange 16, the profiled strip 15 is provided with a head piece 30 covering the housing 2 as well as the clamping ring 26 along their end faces.

By means of the aforementioned type of mounting, the inflatable bag 1 can be attached advantageously to the flange 16 of the housing 2 in a rapid and flawless manner. Furthermore, with the mounting of the present invention, the material of the bag 1 is protected at the tensioning or clamping zone, whereby in a further advantageous manner a high operating safety is obtained over a long period of operating time of the automotive vehicle.

While we have shown and described an embodiment in accordance with the present invention, it is to be clearly understood that numerous changes and modifications may be made without departing from the scope of our invention. For example, it is also possible to join a profiled strip of a rubber-elastic material to the rim of a bag by means of vulcanizing, and to provide the profiled strip on the side facing away from the rim with an extension for connection to a holding flange. Therefore, we do not wish to be limited to the details shown and described herein but intend to cover all such changes and modifications as come within the scope of the appended claims.

We claim:

1. A restraining device for the occupants of a vehicle comprising an inflatable bag with a thickened edge at its opening, means for inflating the bag, a housing containing the bag in a folded condition, said housing having a flange for holding the bag, clamping means for connecting the thickened edge of the bag and the flange and an elastic profiled strip containing the thickened edge of the bag and arranged between the flange and the clamping means, the profiled strip having a channel with a configuration for receiving the thickened edge.

2. A restraining device according to claim 1, wherein the profiled strip has a channel with an approximately keyhole-shaped cross section for receiving the thickened edge.

3. A restraining device according to claim 1, wherein the thickened edge is formed by bending the edge of the bag around a cord-like insert, the channel in said profiled strip having an expansion therein so as to accommodate the edge about the cord-like insert.

4. A restraining device according to claim 1, wherein an abutment is provided at at least one of said clamping means and said flange, and the profiled strip is constructed so as to cooperate with the at least one abutment.

5. A restraining device according to claim 1, wherein the profiled strip has a channel-like indentation in its outer surfaces, a projection is provided on the flange for engaging one such indentation, and an angle section being provided on the clamping means for engaging another indentation to act as an abutment.

6. A restraining device according to claim 1, wherein the profiled strip is provided with a head piece means for covering end faces of the flange and the clamping means.

7. A restraining device according to claim 1, wherein the profiled strip is constructed from an endless extrusion article.

8. A restraining device according to claim 1, wherein the clamping means is in the form of a ring having two halves of essentially U-shaped cross section with legs of different length, and the housing is provided with an abutment surface with which one of the legs cooperates.

9. A restraining device according to claim 8, wherein the leg cooperating with the housing abutment surface is provided with an end face for abutting against the outer wall of the housing.

10. A restraining device according to claim 8, wherein the clamping ring is a cast article.

11. A restraining device according to claim 1, wherein the strip is vulcanized to the thickened edge of the bag.

* * * * *